(12) United States Patent
Lee et al.

(10) Patent No.: US 8,712,434 B2
(45) Date of Patent: Apr. 29, 2014

(54) APPARATUS FOR PROVIDING LOCATION INFORMATION OF HAND-HELD DEVICE AND METHOD THEREOF

(75) Inventors: Sim Hong Lee, Seoul (KR); Han Bok Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/524,635

(22) Filed: Jun. 15, 2012

(65) Prior Publication Data

US 2012/0315923 A1 Dec. 13, 2012

Related U.S. Application Data

(63) Continuation of application No. 12/526,895, filed as application No. PCT/KR2008/000654 on Feb. 4, 2008, now Pat. No. 8,224,347.

(30) Foreign Application Priority Data

Feb. 13, 2007 (KR) .................. 10-2007-0014960

(51) Int. Cl.
*H04W 24/00* (2009.01)

(52) U.S. Cl.
USPC ..................................... 455/456.1

(58) Field of Classification Search
USPC ........................... 455/456.1–456.6
See application file for complete search history.

(56) References Cited

U.S. PATENT DOCUMENTS

| | | |
|---|---|---|
| 5,152,012 A | 9/1992 | Schwob |
| 5,877,817 A | 3/1999 | Moon |
| 6,233,518 B1 | 5/2001 | Lee |
| 6,716,101 B1 | 4/2004 | Meadows et al. |
| 7,061,545 B1 | 6/2006 | Kweon et al. |
| 7,920,871 B2 | 4/2011 | Okuda |
| 2003/0073447 A1 | 4/2003 | Ogaki et al. |
| 2003/0117316 A1* | 6/2003 | Tischer ................ 342/357.1 |
| 2003/0212995 A1 | 11/2003 | Kitamori |
| 2004/0005142 A1 | 1/2004 | Yoo et al. |
| 2004/0054428 A1 | 3/2004 | Sheha et al. |
| 2004/0202292 A1 | 10/2004 | Cook |
| 2004/0237123 A1 | 11/2004 | Park |
| 2005/0253966 A1 | 11/2005 | Mertens |
| 2005/0288036 A1 | 12/2005 | Brewer et al. |
| 2006/0040667 A9 | 2/2006 | Coppinger et al. |
| 2006/0040677 A1 | 2/2006 | Dietrich et al. |
| 2006/0063539 A1 | 3/2006 | Beyer |
| 2006/0176399 A1 | 8/2006 | Kwak et al. |

(Continued)

FOREIGN PATENT DOCUMENTS

| | | |
|---|---|---|
| CN | 1396743 A | 2/2003 |
| CN | 1476570 | 2/2004 |

(Continued)

OTHER PUBLICATIONS

PCT International Search Report dated Jul. 22, 2009.

(Continued)

*Primary Examiner* — Nathan Mitchell
(74) *Attorney, Agent, or Firm* — KED & Associates LLP

(57) ABSTRACT

A method and apparatus for providing location information of a user terminal is provided, which makes it possible to mark the location of a user terminal using geographical information stored in a broadcast receiver.

13 Claims, 9 Drawing Sheets

(56) References Cited

U.S. PATENT DOCUMENTS

| | | |
|---|---|---|
| 2006/0225108 A1 | 10/2006 | Tabassi et al. |
| 2006/0255935 A1 | 11/2006 | Scalisi et al. |
| 2006/0258374 A1* | 11/2006 | Galetti .................. 455/456.2 |
| 2007/0184855 A1 | 8/2007 | Klassen et al. |
| 2008/0102756 A1 | 5/2008 | Lehtinen |
| 2009/0088125 A1 | 4/2009 | Wollmershauser et al. |

FOREIGN PATENT DOCUMENTS

| | | |
|---|---|---|
| CN | 1666503 | 9/2005 |
| CN | 1717020 | 1/2006 |
| EP | 1 001 614 | 5/2012 |
| JP | 2005-295030 | 10/2005 |
| JP | 2006-094079 | 4/2006 |
| KR | 10-0620792 | 8/2006 |
| WO | WO 03/005362 | 1/2003 |
| WO | WO 03/071825 | 8/2003 |
| WO | WO 2005/004344 | 1/2005 |
| WO | WO 2006/064471 | 6/2006 |
| WO | WO 2007/066896 | 6/2007 |

OTHER PUBLICATIONS

European Search Report dated Mar. 2, 2010 for Application No. 08 712 306.3.

European Office Action dated Jul. 21, 2010 for Application No. 08 712 306.3.

Chinese Office Action dated Nov. 2, 2011 for Application No. 200880004832.3 (with translation).

English language translation of Chinese Office Action for Application 200880004832.3 dated Jul. 20, 2012.

Korean Notice of Allowance for Application 10-2007-0014960 dated Nov. 5, 2013 and English language translation.

\* cited by examiner

FIG. 6
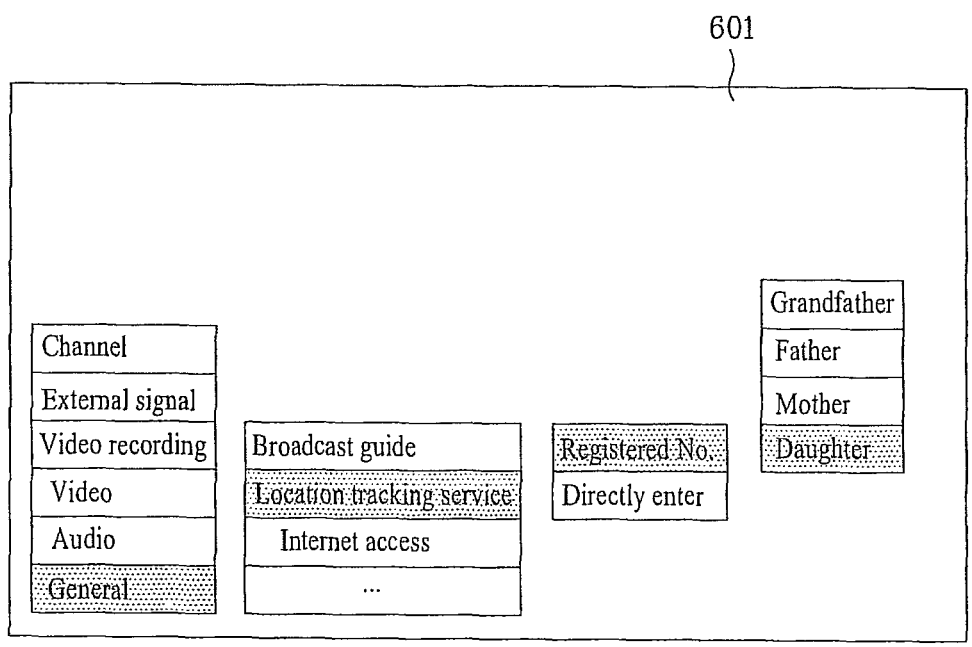
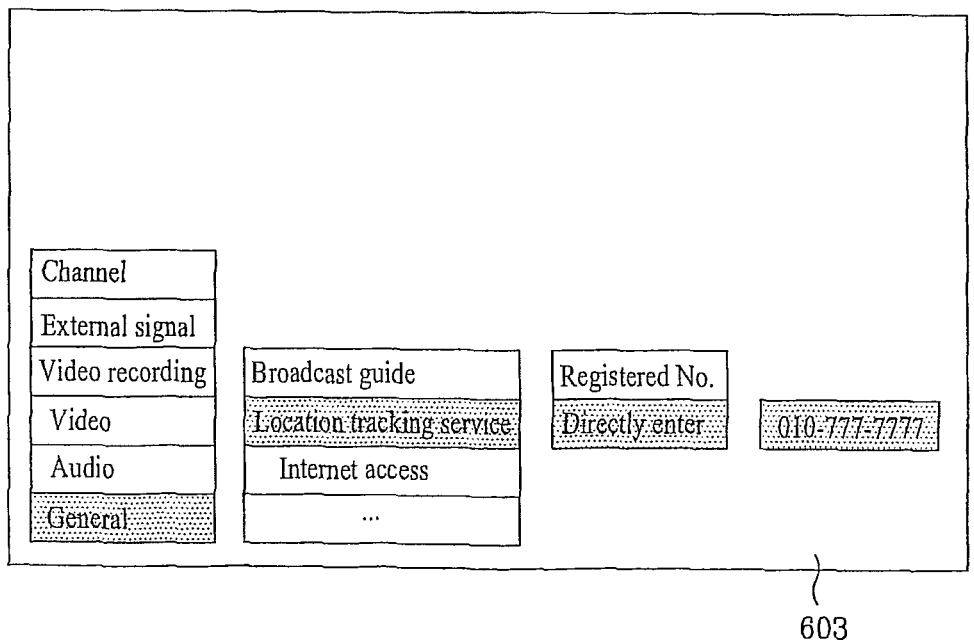

APPARATUS FOR PROVIDING LOCATION INFORMATION OF HAND-HELD DEVICE AND METHOD THEREOF

This application is a continuation application of U.S. application Ser. No. 12/526,895, filed Aug. 12, 2009, which is a U.S. National Stage of International Application PCT/KR2008/000654 filed Feb. 4, 2008, which claims priority to Korean Application 10-2007-0014960 filed Feb. 13, 2007, the entire contents of which are hereby incorporated by reference in their entirety.

TECHNICAL FIELD

The present invention relates to a method and apparatus for a broadcast receiver providing location information of a user terminal, and more particularly, to a method and apparatus for a broadcast receiver providing location information of a user terminal, wherein location information of a user terminal is marked on map information.

BACKGROUND ART

The use of not only wired Internet services but also various wireless Internet services using mobile communication terminals such as mobile phones or PDAs have been significantly increased along with the development of Internet technologies. The development of wireless Internet technologies is realizing a ubiquitous environment in which users can freely access networks anywhere and anytime. An example technology for realizing such a ubiquitous environment is a Location Based Service (LBS)-related technology which has been intensively developed along with the development of wireless Internet and mobile computing technologies. The LBS has been used in various situations and various applications such as Customer Relationship Management (CRM), Geographic Information Systems (GISs) for providing vicinity information, criminal or emergency signals, and SOS. To use the LBS, it is necessary to locate wireless communication terminals. Technologies used for locating terminals using wireless communication are divided into a location technology based on base stations and a location technology based on GPS satellites. A combination of the base-station-based and GPS-satellite-based location technologies has also been used recently. To locate terminals based on base stations, terminals register their current location information in a Home Location Register (HLR). The mobile communication network can determine a base station whose range includes a mobile terminal such as a mobile phone or a PDA since its current location information registered in the HLR includes identification information of the base station which is currently responsible for wireless communication with the mobile terminal. The GPS-based location method determines the current location of a mobile phone or the like using GPS signals received from 24 GPS satellites that orbit the Earth. The GPS-based location method generally uses triangulation. When the counterpart requests transmission of location information from a terminal such as a mobile phone in order to locate the terminal, the terminal marks the current location of the terminal determined using GPS signals on a map. Specifically, the terminal retrieves map information from a database in the terminal or from a separate server and marks the current location of the terminal on the map information and transmits the map information marked with the current location to the counterpart.

However, this conventional method has the following problems. A very large amount of data is transmitted and received since the user terminal transmits the map marked with the current location to the counterpart.

The counterpart cannot directly mark places associated with the location of the user terminal (for example, places which the user of the user terminal frequently visits) on the map since the counterpart only passively confirms the location of the user terminal received from the user terminal.

When the user of the user terminal desires to transmit video or audio information of ambient environments or the like of the user terminal in addition to the current location of the user terminal, it is necessary to transmit information a number of times since the user terminal cannot transmit the video or audio information together with the location information.

DISCLOSURE

Technical Problem

An object of the present invention devised to solve the problem lies in a method and apparatus for providing location information of a user terminal, wherein it is possible to locate the user terminal such as a mobile phone using a broadcast receiver.

Another object of the present invention devised to solve the problem lies in providing a method and apparatus for providing location information of a user terminal, wherein map information is stored in a broadcast receiver, so that it is possible to mark the current location of the user terminal at the broadcast receiver even if the broadcast receiver has received only coordinate information of the current location of the user terminal from the user terminal.

Another object of the present invention devised to solve the problem lies in providing a method and apparatus for providing location information of a user terminal, wherein a broadcast receiver can receive and output video or audio information together with location information of the user terminal from the user terminal.

Another object of the present invention devised to solve the problem lies in providing a method and apparatus for providing location information of a user terminal, wherein it is possible to confirm the location information of the user terminal even when power of the broadcast receiver is off.

Another object of the present invention devised to solve the problem lies in providing a method and apparatus for providing location information of a user terminal, wherein it is possible to modify geographical information stored in a broadcast receiver.

Technical Solution

The objects of the present invention can be achieved by providing a method for a broadcast receiver providing location information of a user terminal connected to the broadcast receiver through a communication network, the method including requesting location information of the user terminal from the user terminal; receiving the location information from the user terminal in response to the request; retrieving geographical information stored in the broadcast receiver; marking a location of the user terminal on the geographical information using the location information; and outputting the marked location of the user terminal.

In another aspect of the present invention, provided herein is a broadcast receiver for performing a method for providing location information of a user terminal, the broadcast receiver including a user interface functioning to interface with a user; a communication unit for requesting location information of a user terminal from the user terminal through a communication network and receiving the location information from the user terminal in response to the request; a storage unit for storing geographical information; a location information processor for marking a location of the user terminal on the geographical information using the location information received from the user terminal; an output unit for outputting the marked location of the user terminal; and a controller for controlling overall operations of the broadcast receiver and allowing the location of the user terminal to be marked and output on the geographical information according to a request from the user through the user interface.

Advantageous Effects

As described above, the method and apparatus for providing location information of a user terminal according to the invention has a variety of advantages. For example, it is possible to locate the user terminal using a broadcast receiver.

The broadcast receiver marks the location of the user terminal using geographical information stored in the broadcast receiver so that the broadcast receiver does not need to receive geographical information from the user terminal, thereby reducing the amount of transmission data required to mark the location of the user terminal.

The user terminal can transmit video or audio information together with the location information of the user terminal to the broadcast receiver while the broadcast receiver can receive and output the video or audio information together with the location information of the user terminal.

At the broadcast receiver, it is still possible to confirm the location information of the user terminal even when the power of the broadcast receiver is off.

It is also possible to modify geographical information stored in the broadcast receiver.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 illustrates an OSD according to an embodiment of the invention.

BEST MODE

Reference will now be made in detail to the preferred embodiments of the present invention, examples of which are illustrated in the accompanying drawings.

Figure 1:
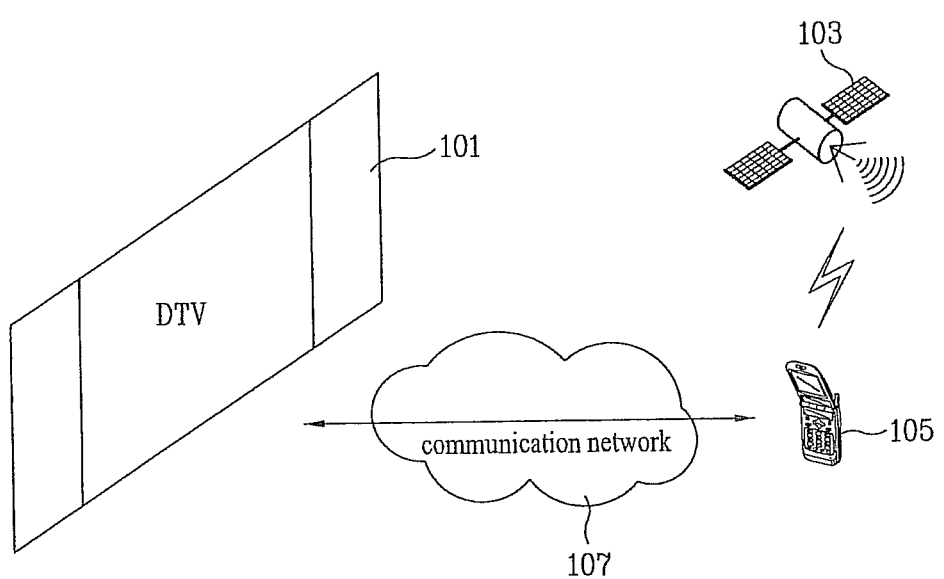
FIG. 1 schematically illustrates a system for providing location information of a user terminal according to an embodiment of the invention.

FIG. 1 schematically illustrates a system for providing location information of user terminals according to an embodiment of the invention. As shown in FIG. 1, the system for providing location information of user terminals includes a broadcast receiver 101, GPS satellites 103, a user terminal 105, and a communication network 107. The broadcast receiver 101 is a device that receives a broadcast signal and outputs broadcast information such as video or audio. The broadcast receiver 101 according to the invention is coupled to the user terminal 105 through the communication network 107. The broadcast receiver 101 includes a data communication module which allows it to perform network interfacing with the user terminal 105. The broadcast receiver 101 requests location information of the user terminal 105 from the user terminal 105 through the data communication module and receives the location information from the user terminal 105 in response to the request. The user terminal 105 is easy to carry and includes a mobile phone, PDA, PMP, or the like which can perform communication with the broadcast receiver 101. The user terminal 105 according to the invention includes a GPS signal receiving module which can receive GPS signals from the GPS satellites 103. The user terminal 105 receives GPS signals from the GPS satellites 103 and determines a current location of the user terminal 105 and transmits the current location of the user terminal 105 to the broadcast receiver 101. The broadcast receiver 101 retrieves geographical information stored in the broadcast receiver 101 in order to mark the current location information on a map. The broadcast receiver 101 marks the current location of the user terminal 105 on the retrieved geographical information and then outputs the geographical information marked with the current location.

Figure 2:
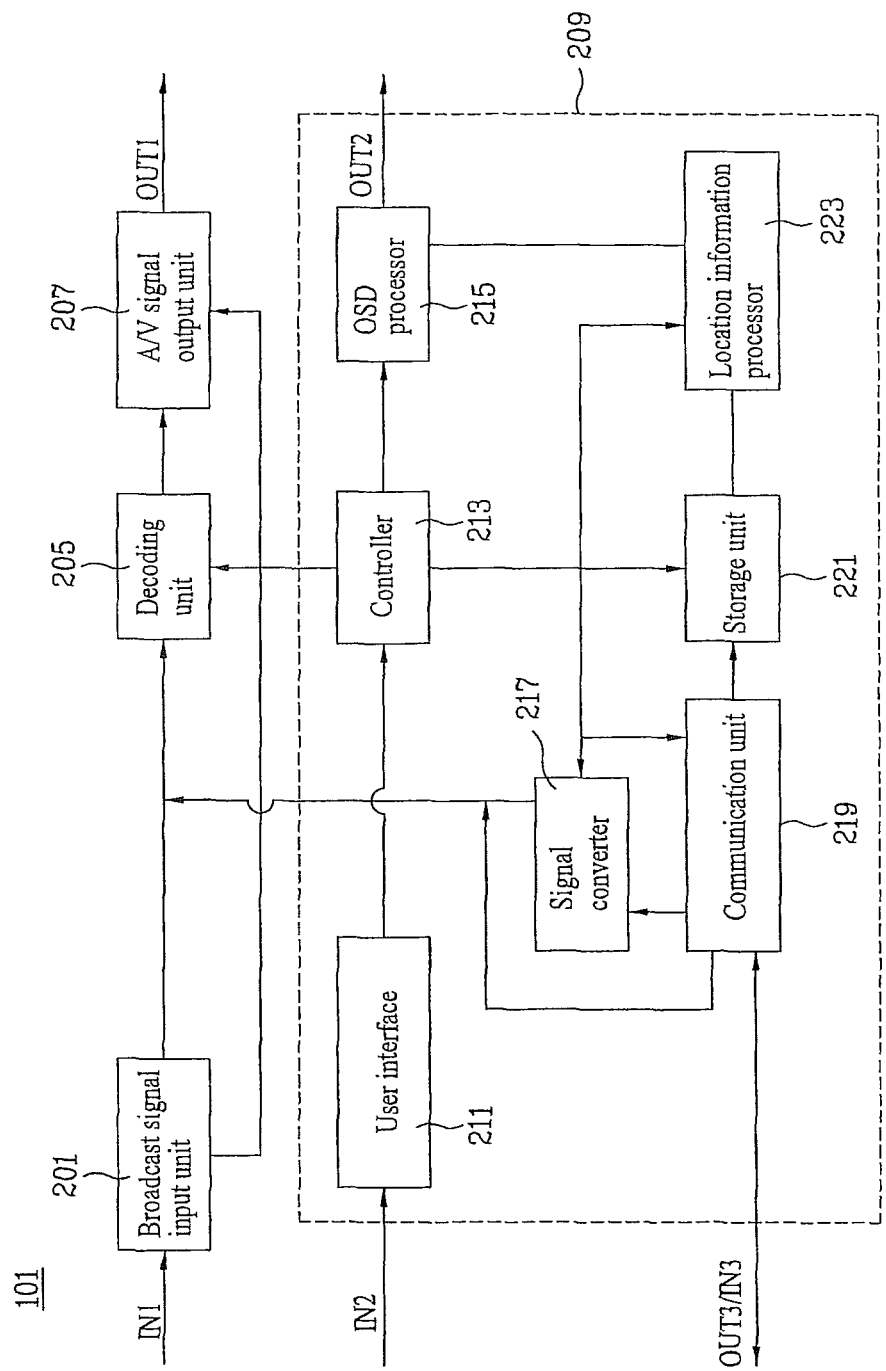
FIG. 2 is an internal block diagram of a broadcast receiver according to an embodiment of the invention.

FIG. 2 is an internal block diagram of the broadcast receiver 101 according to an embodiment of the invention. As shown in FIG. 2, the broadcast receiver 101 includes a broadcast signal input unit 201, a decoding unit 205, an A/V signal output unit 107, and a location information provider 209 for implementing the method for providing location information according to the invention. The broadcast signal input unit 201 tunes to a channel frequency received through an antenna, a cable, a satellite, or the like. The broadcast signal input unit 201 demodulates the tuned signal into a transport stream according to a method, which is the inverse of a modulation method that was performed on the signal at the transmitting side. In the case where the broadcast signal input unit 201 receives an analog broadcast signal, the broadcast signal input unit 201 decodes the analog broadcast signal using an analog signal decoder (not shown) and an MPEG-2 encoder (not shown). The broadcast signal input unit 201 can receive a broadcast signal from an external device. In the case where the broadcast signal input unit 201 receives a signal such as a DVD or HDMI signal from the external device, the broadcast signal input unit 201 decodes the received signal by converting it into a format complying with the specification of the broadcast receiver 101. The decoding unit 205 separates audio, video, and other data streams from the demodulated transport stream with reference to a packet ID and decodes the separated audio, video, and other data streams using respective decoding algorithms to reconstruct original signals. The reconstructed signals are output to a screen and a speaker through the A/V signal output unit so that the screen displays the video signal and the speaker outputs the audio signal.

The location information provider 209 includes a user interface 211, a controller 213, an OSD processor 215, a signal converter 217, a communication unit 219, a storage unit 221, and a location information processor 223. The user interface 211 functions to interface with the user and transfers commands from the user to the controller 213. The user interface 211 includes a remote controller or a keypad mounted on the broadcast receiver 101. The OSD processor 215 generates and outputs OSD data. Using the OSD processor 215, the user can select the location information providing method of the invention and input identification information of a user terminal which the user desires to locate. When the broadcast receiver 101 receives location information from the user terminal 105, the OSD processor 215 marks the location of the user terminal on geographical information and outputs the geographical information marked with the location. The OSD processor 215 can output the geographical information together with or separately from the signal from the A/V signal output unit 207. That is, the user can use the location information of the user terminal received from the user terminal 105 while viewing or listening to a video or audio signal output through the A/V signal output unit 207. The location information that the broadcast receiver 101 receives from the user terminal 105 may include video or audio information. In the case where the location information of the user terminal received from the communication unit 219 includes video or audio information that does not comply with the specification of the broadcast receiver 101, the signal converter 217 converts the format of the video or audio information into a format complying with the specification of the broadcast receiver 101. The communication unit 219 provides an interfacing function when the broadcast receiver 101 performs two-way data communication with the user terminal 105. The broadcast receiver 101 transmits a signal requesting user terminal location information to the user terminal 105 through the communication unit 219 and receives the user terminal location information from the user terminal 105 through the communication unit 219. The location information processor 223 uses the received user terminal location information and the geographical information retrieved from the storage unit 221 to mark the current location of the user terminal on the retrieved geographical information. That is, the location information processor 223 receives coordinate information of the user terminal 105 from the user terminal 105 and marks the coordinate information on geographical information including administrative location information such as street name and number and facility location information such as location information of main facilities and buildings. The controller 213 controls the overall operations of the broadcast receiver 101 and requests that the user terminal 105 transmit location information according to a command of the user received through the user interface 211 and marks the current location of the user terminal on the geographical information using the user terminal location information received from the user terminal 105.

The storage unit 221 stores an operating program, a system program, and geographical information used to mark the user terminal location information. The storage unit 221 may include a PVR or DVR. The PVR or DVR includes a hard disk drive (HDD) and an HDD interface. Although not illustrated, the PVR or DVR can be connected to an external HDD to extend the storage capacity thereof. Although it is assumed here that the geographical information is stored in a database of the storage unit 221, the invention is not limited to this assumption and can also be extracted from a Geographic Information System (GIS) (not shown). The storage unit 221 can store geographical information marked with the location of the user terminal 105 automatically or according to selection of the user of the broadcast receiver. When the broadcast receiver user desires to store a movement path of the user terminal 105, the broadcast receiver user inputs a command for the controller 213 to store the movement path of the user terminal 105 through the user interface 211. According to the command of the broadcast receiver user, the controller 213 controls the location information processor 221 and the storage unit 221 to store the geographical information marked with the location of the user terminal 105 in the storage unit 221. Upon receiving the command from the controller 213, the location information processor 223 marks locations of the user terminal 105 on the geographical information in the order in which a series of corresponding location information of the user terminal 105 are received from the user terminal 105 to mark the movement path of the user terminal 105 on the geographical information and transfers the geographical information marked with the movement path of the user terminal 105 to the storage unit 221. The storage unit 221 stores the geographical information received from the location information processor 223. In order to confirm the current location or the movement path of the user terminal 105, the broadcast receiver user requests that the controller 213 provide the locations of the user terminal 105 using the user interface 211. In response to the request from the broadcast receiver user, the controller 213 retrieves and outputs the geographical information marked with the movement path of the user terminal 105.

Figure 3:
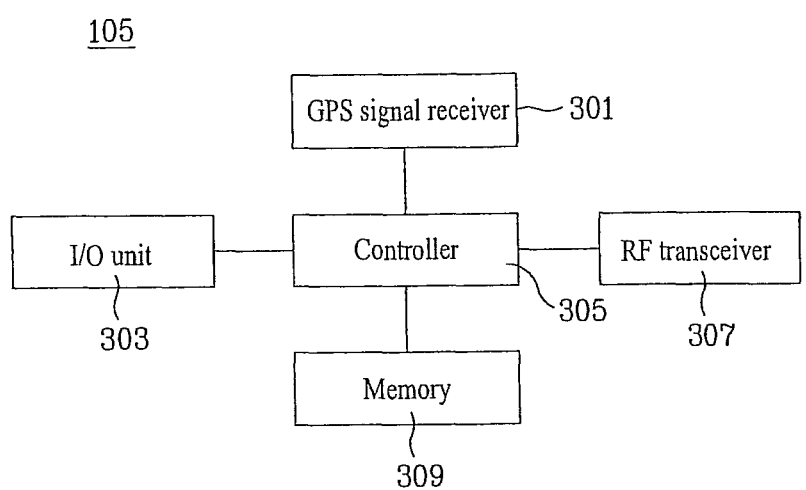
FIG. 3 is an internal block diagram of a user terminal according to an embodiment of the invention.

FIG. 3 is an internal block diagram of a user terminal according to an embodiment of the invention. As shown in FIG. 3, the user terminal 105 includes a GPS signal receiver 301, an input/output (IO) unit 303, a controller 305, an RF transceiver 307, and a memory unit 309. The GPS signal receiver 301 receives GPS signals from multiple GPS satellites. When the broadcast receiver 101 requests user terminal location information from the user terminal 105, the GPS signal receiver 301 of the user terminal 105 calculates GPS coordinates from the GPS signals received from the GPS satellites. The I/O unit 303 includes an input unit (not shown) and an output unit (not shown). The input unit processes input data such as commands, characters, or numbers that the user has input using a keypad on the user terminal or voice information that the user has input using a microphone. When the user terminal 105 receives a request to transmit user terminal location information from the broadcast receiver 101, the input unit receives an input to choose whether or not to transmit the location information from the user of the user terminal. The output unit outputs the overall states of the user terminal, information that the user has input through the input unit, or the like through the screen or speaker. When the user terminal 105 receives a request to transmit user terminal location information from the broadcast receiver 101, the output unit outputs information indicating the request to allow the user of the user terminal 105 to decide whether or not to transmit the location information. The RF transceiver 307 converts an RF signal requesting user terminal location information received from a base station into an electrical signal and inputs the electrical signal to the controller 305. The RF transceiver 307 also converts GPS coordinates received from the controller 305 into an RF signal and transmits the RF signal to the base station. The memory unit 309 stores a system program and an operating program of the controller 305 and an identification number of the broadcast receiver 101 which is permitted to receive location information of the user terminal 105. The controller 305 controls the overall operations of the user terminal 105 while controlling operations associated with the method for providing location information of the user terminal according to the invention. When receiving a request to transmit user terminal location information from the broadcast receiver 101, the controller 305 retrieves a broadcast receiver identification number stored in the memory unit 309 and compares the stored broadcast receiver identification number with the identification number of the broadcast receiver 101 which has made the request to transmit user terminal location information. The controller 305 retrieves and transmits GPS coordinates to the broadcast receiver 101 when the broadcast receiver identification number stored in the memory unit 309 is identical to the identification number of the broadcast receiver 101 which has made the request to transmit user terminal location information.

Figure 4:
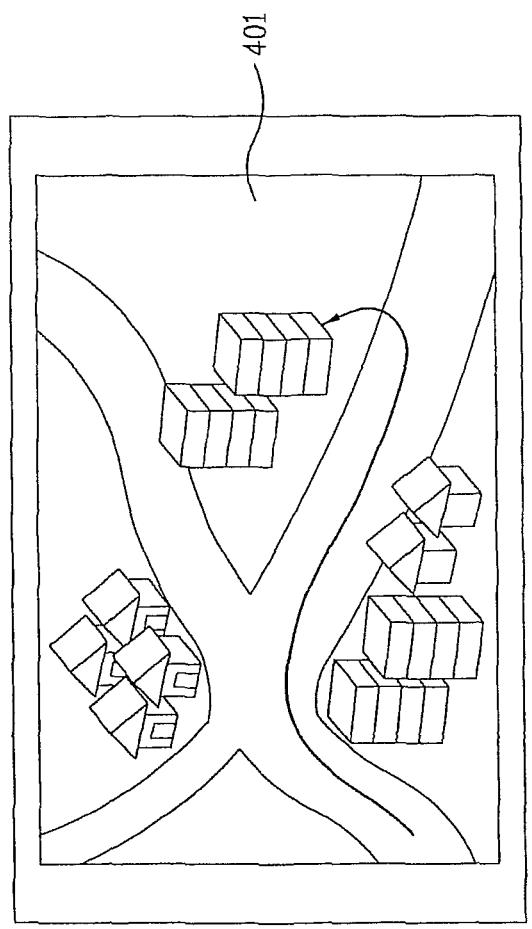
FIGS. 4 and 5 illustrate a screen of a broadcast receiver according to an embodiment of the invention.
Figure 5:
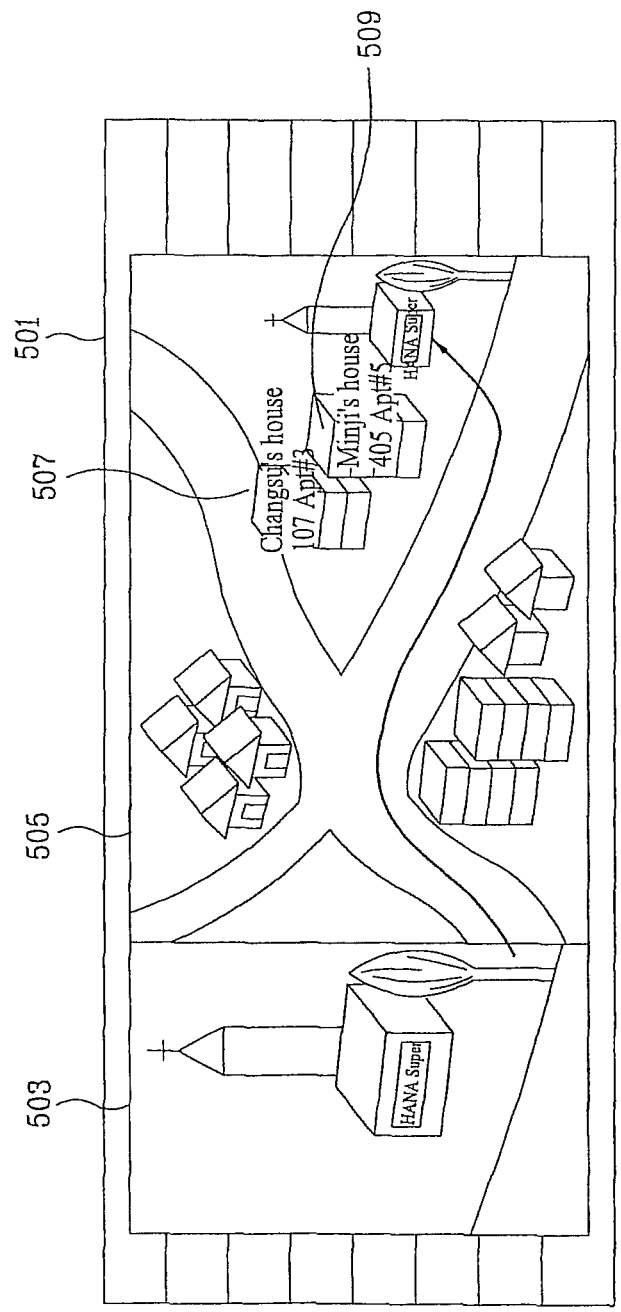

FIGS. 4 and 5 illustrate a screen of a broadcast receiver which outputs user terminal location information according to an embodiment of the invention. The broadcast receiver 101 receives user terminal coordinate information from the user terminal 105 and marks the user terminal location information on the geographical information and then outputs the geographical information marked with the user terminal location information. The broadcast receiver 101 continuously marks locations of the user terminal 105 in the order in which a series of corresponding location information of the user terminal 105 are received from the user terminal 105 to mark (or display) the movement path of the user terminal 105 on a screen 401. As shown in FIG. 5, the screen 501 of the broadcast receiver 101 is divided into a portion 505 for displaying user terminal location information and a portion 503 for displaying image information received together with the user terminal location information from the user terminal 105. When receiving a request to transmit user terminal location information from the broadcast receiver 101, the user of the user terminal can choose whether or not to transmit video or audio information together with the location information. When the user of the user terminal 105 has chosen to transmit video or audio information together with the location information, the user terminal 105 generates video or audio information and transmits the video or audio information together with the coordinate information to the broadcast receiver 101. Specifically, in response to the location information transmission request, the user of the user terminal 105 captures an image of the vicinity of the user terminal 105 or records a voice message which the user desires to deliver to the user of the broadcast receiver 101. The user terminal 105 transmits the video or audio information together with the user terminal location information to the broadcast receiver 101. The broadcast receiver 101 displays the video information received together with the user terminal location information from the user terminal 105 on the screen 501. The broadcast receiver 101 outputs the audio information received together with the user terminal location information from the user terminal 105 through the speaker (not shown).

In the example of FIGS. 4 and 5, the location of the user terminal 105 can be output through the A/V signal output unit 207 or the OSD processor 215. The location of the user terminal 105 can also be output together with broadcast information received through the broadcast signal input unit 201. That is, the broadcast information and the user terminal location information can be output together or separately. When the user of the broadcast receiver 101 makes a request to power the broadcast receiver 101 off through the user interface 211, the broadcast receiver 101 requests that the broadcast receiver user choose whether to continue or stop outputting the user terminal location information. When the broadcast receiver user chooses to continue outputting the user terminal location information, the broadcast receiver 101 turns off power to components, other than the location information provider 209 which performs the method for providing location information, and supplies power to the components of the location information provider 209 (i.e., the user interface 211, the controller 21, the OSD processor 215, the signal converter 217, the communication unit 219, the storage unit 221, and the location information processor 223) so that the location information provider 209 continues outputting the user terminal location information.

The user of the broadcast receiver can modify the geographical information stored in the broadcast receiver 101. Specifically, the user of the broadcast receiver can modify the geographical information by adding places, which the user of the user terminal frequently visits or needs to memorize, to the geographical information.

Modified geographical information 507 and 509 is shown in FIG. 5. The user of the broadcast receiver can modify the geographical information by changing the scale of the geographical information, inserting an image, avatar, emoticon, or the like into the geographical information, or inserting audio data into the geographical information.

FIG. 6 illustrates an OSD according to an embodiment of the invention. Upon receiving a menu display request from the user of the broadcast receiver 101, the broadcast receiver 101 displays a menu OSD on a screen 601 or 603 as shown in FIG. 6. The menu OSD includes various menu items such as channel, external signal, video recording, video, audio, and general menu items. The general menu item includes submenu items such as broadcast guide, location tracking service, and Internet access. When the user of the broadcast receiver selects the location tracking service from the submenu items, a window for entering the identification number of a user terminal 105 for location tracking is displayed. When the broadcast receiver user desires to track the location of a user terminal 105 whose identification number has been previously stored (or registered) in the broadcast receiver 101, the broadcast receiver user selects the registered user terminal identification number. The controller 213 of the broadcast receiver 101 retrieves the unique identification number of the broadcast receiver 101 and the identification number of the user terminal 105 selected by the broadcast receiver user and transmits the retrieved identification numbers to the user terminal 105 through the communication unit 219.

When the broadcast receiver user desires to track the location of a user terminal 105 whose identification number is not stored in the broadcast receiver 101, the broadcast receiver user directly enters the identification number of the user terminal 105 not stored in the broadcast receiver 101 as illustrated on the screen 603. The broadcast receiver 101 then transmits the unique identification number of the broadcast receiver 101 and the identification number of the user terminal 105 entered by the broadcast receiver user to the user terminal 105.

Figure 7:
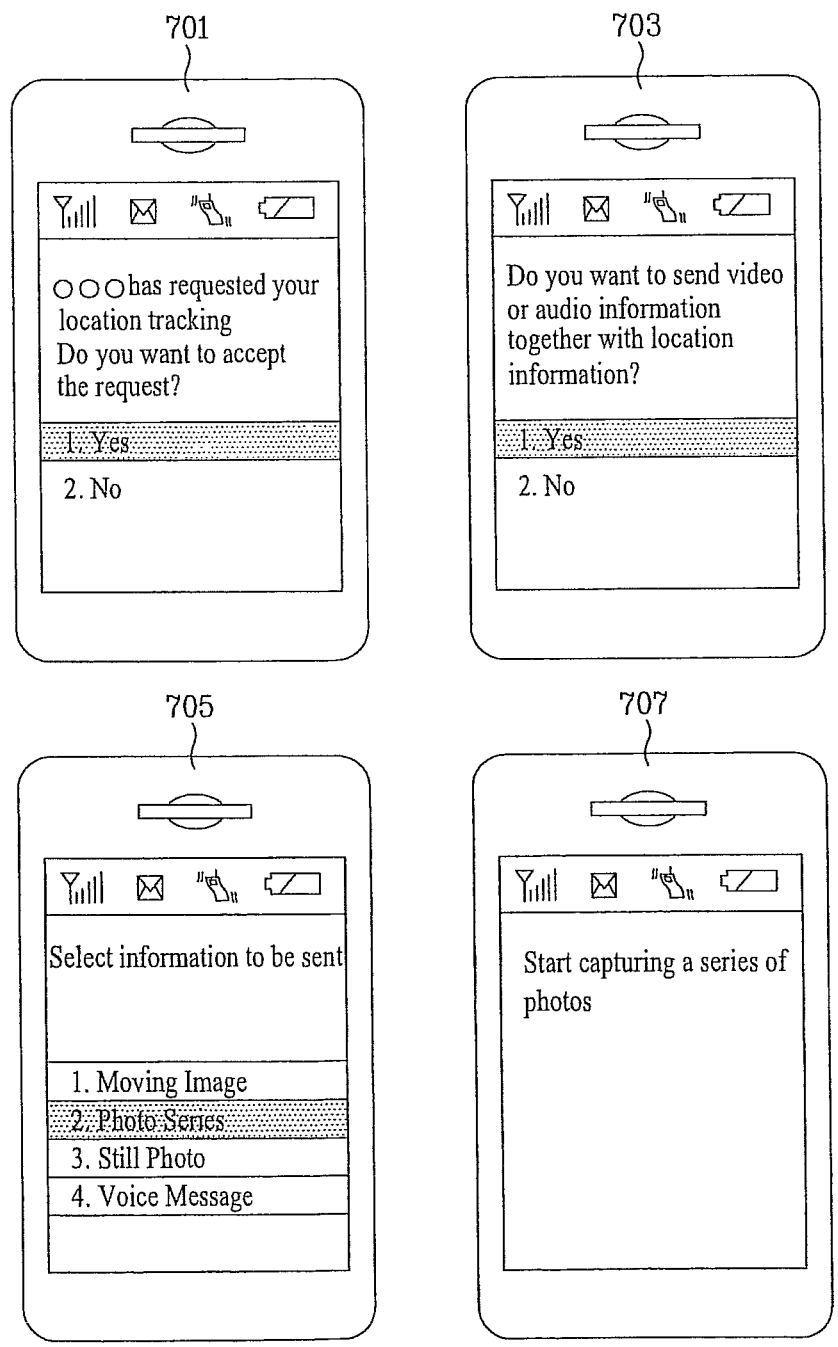
FIG. 7 illustrates a procedure in which a user terminal accepts a location information transmission request according to an embodiment of the invention.

FIG. 7 illustrates a procedure in which a user terminal accepts a location information transmission request according to an embodiment of the invention. Upon receiving a location information transmission request from the broadcast receiver 101, the user terminal 105 displays the request on a screen 701 and receives an input to choose whether or not to transmit location information from the user of the user terminal 105 as shown in FIG. 7. Although the user of the user terminal 105 may choose whether or not to transmit location information each time the user terminal 105 receives a location information transmission request from the broadcast receiver 101, the user terminal 105 may also automatically decide whether or not to transmit the user terminal location information as described above with reference to FIG. 3. Specifically, the user terminal 105 previously stores an identification number of a broadcast receiver, which is permitted to receive location information of the user terminal 105, in the memory unit 309. Then, when the user terminal 105 receives a request to transmit user terminal location information from a broadcast receiver 101, the user terminal 105 may compare the identification number of the broadcast receiver stored in the memory with the identification number of the broadcast receiver 101 which has made the location information transmission request and then may automatically retrieve and transmit corresponding GPS coordinates to the broadcast receiver 101 when the two identification numbers are identical. If the user of the user terminal 105 permits the broadcast receiver 101 to receive location information and then chooses to transmit video or audio information together with the location information, the user terminal 105 allows the user to enter video or audio information to be transmitted together with the location information on a screen 705 and receives the entered video or audio information. The user terminal 105 generates video or audio information to be transmitted together with the location information using a screen 707 or using a microphone. The user terminal 105 transmits the generated video or audio information together with the location information to the broadcast receiver 101.

Figure 8:
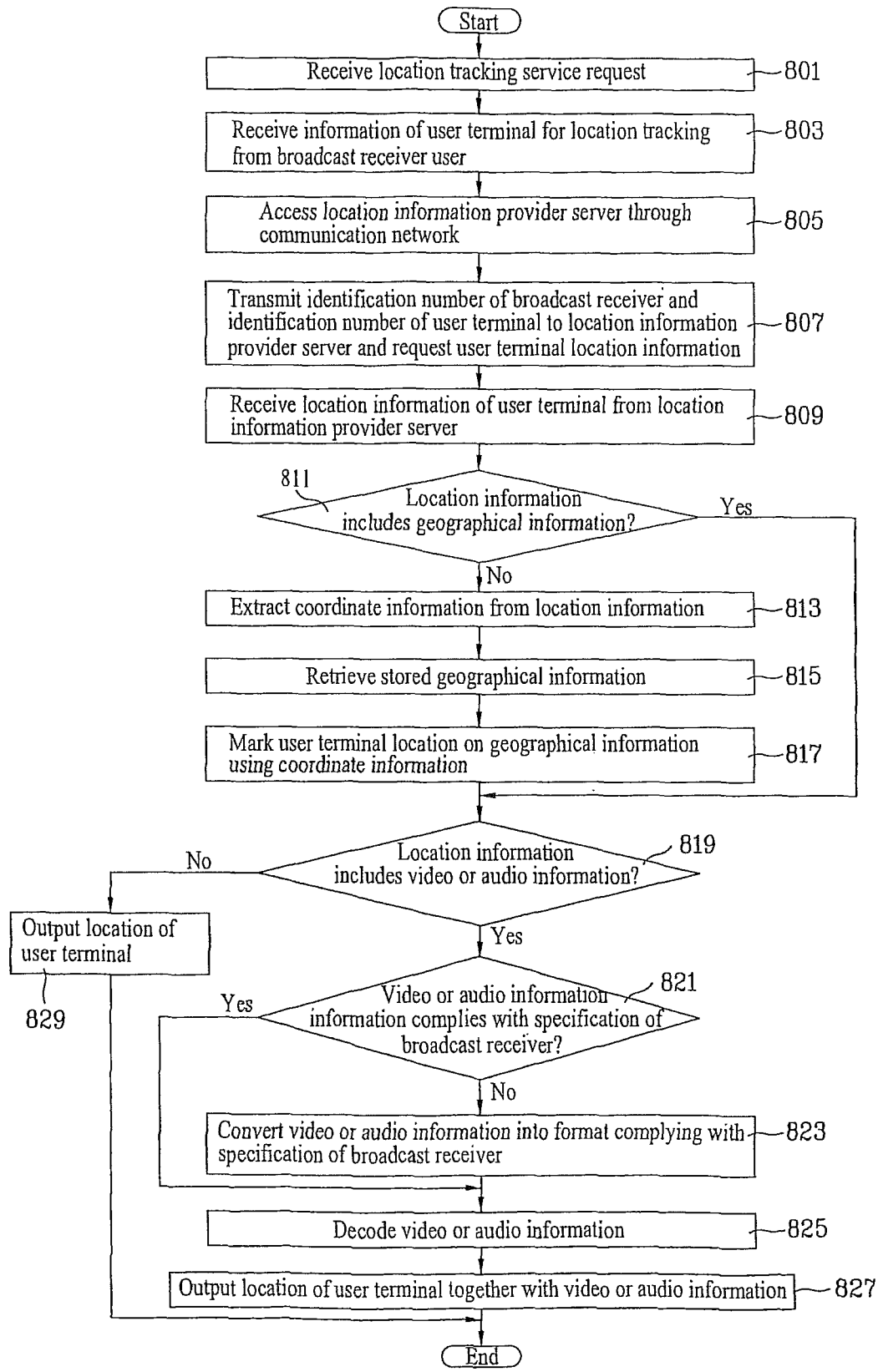
FIG. 8 is a flow chart of a method for providing location information, which is performed at a broadcast receiver according to an embodiment of the invention.

FIG. 8 is a flow chart of a method for providing location information, which is performed at a broadcast receiver according to an embodiment of the invention. As shown in FIG. 8, the broadcast receiver 101 receives a location tracking service request from the user of the broadcast receiver 101 (801). The user of the broadcast receiver can select the location tracking service from the menu using the OSD as in the example of FIG. 6. The broadcast receiver 101 receives information of the user terminal for location tracking from the broadcast receiver user (803). The broadcast receiver 101 accesses a location information provider server (not shown) through the communication network 107 (805). The broadcast receiver 101 transmits a signal which carries the identification number of the broadcast receiver and the identification number of the user terminal to a base station (not shown) through the communication network 107 and requests location information of the user terminal (807). The base station receives the signal from the broadcast receiver 101 and transmits the signal to the location information provider server. The location information provider server locates the user terminal 105 whose location tracking has been requested by the broadcast receiver 101 and transmits the received signal to the user terminal 105. The user terminal 105 generates user terminal location information in response to the request from the broadcast receiver 101 and transmits the user terminal location information to the location information provider server through the base station. The broadcast receiver 101 receives the location information of the user terminal 105 from the location information provider server (809). The broadcast receiver 101 determines whether or not the location information includes geographical information (811). The broadcast receiver 101 extracts coordinate information from the location information if the location information does not include geographical information (813). The broadcast receiver 101 retrieves geographical information for a location corresponding to the coordinate information from the storage unit 221 (815). The broadcast receiver 101 marks the location of the user terminal on the geographical information using the coordinate information (817). The broadcast receiver 101 also determines whether or not the location information includes video or audio information (819). The broadcast receiver 101 determines whether or not the video or audio information complies with the specification of the broadcast receiver 101 if the location information includes video or audio information (821). The broadcast receiver 101 converts the video or audio information into a format complying with the specification of the broadcast receiver 101 if the video or audio information does not comply with the specification of the broadcast receiver 101 (823). The broadcast receiver 101 decodes the video or audio information complying with the broadcast receiver 101 (825) and outputs the location of the user terminal 105 together with the video or audio information (827). The broadcast receiver 101 outputs the location of the user terminal 105 if the location information does not include video or audio information (829).

Figure 9:
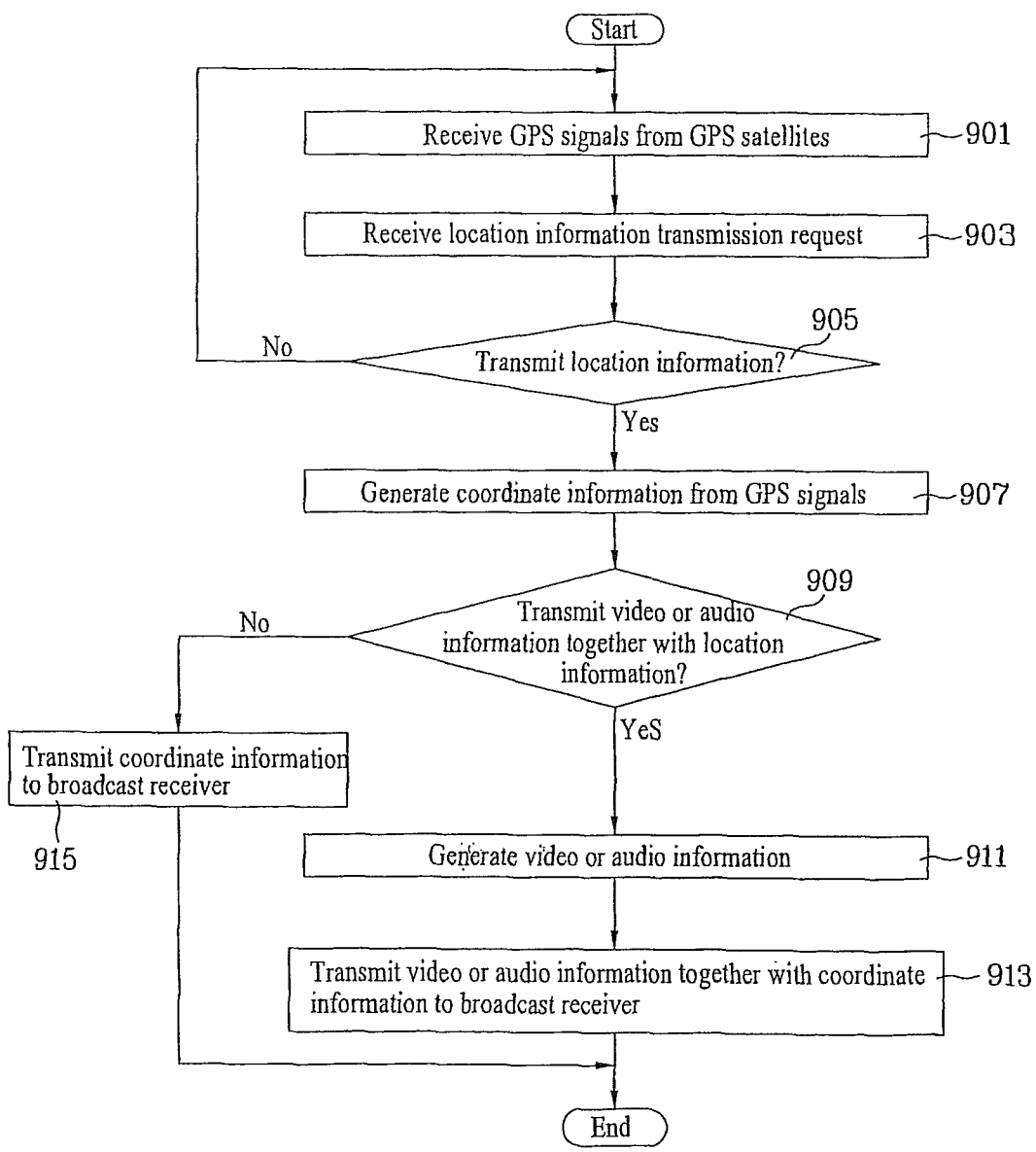
FIG. 9 is a flow chart of a method for providing location information, which is performed at a user terminal according to an embodiment of the invention.

FIG. 9 is a flow chart of a method for providing location information, which is performed at a user terminal according to an embodiment of the invention. As shown in FIG. 9, the user terminal 105 receives GPS signals from GPS satellites 103 (901). To accomplish this, the user terminal 105 includes a GPS signal receiver 301 which can receive GPS signals. The user terminal 105 receives a location information transmission request from the broadcast receiver 101 through a base station (not shown) and a location information provider server (not shown) (903). The user of the user terminal decides whether or not to transmit user terminal location information to the broadcast receiver 101 (905). If the user of the user terminal decides to transmit the user terminal location information to the broadcast receiver 101, the GPS signal receiver 301 generates coordinate information from the GPS signals received from the GPS satellites 103 (907). The user of the user terminal chooses whether or not to transmit video or audio information together with the location information (909). If the user of the user terminal chooses to transmit video or audio information together with the location information, the user terminal 105 generates video or audio information and transmits the video or audio information together with the location information to the broadcast receiver 101 (913). If the user of the user terminal chooses to transmit only the location information, the user terminal 105 transmits corresponding coordinate information to the broadcast receiver 101.

MODE FOR INVENTION

Various embodiments have been described above in the description of the Best Mode section.

INDUSTRIAL APPLICABILITY

The invention allows the broadcast receiver to provide location information of a user terminal.

The invention claimed is:
1. A method for a broadcast receiver to provide location information of a user terminal connected to the broadcast receiver through a communication network, the method comprising:
   registering at least one user terminal;
   storing, at a memory of the broadcast receiver, information corresponding to each of the at least one user terminal;
   requesting, from the broadcast receiver, location information of the user terminal;
   receiving the location information and ambient environment information from the user terminal in response to the request, wherein the environment information is selected from the user terminal, the ambient environment information from the user terminal relates to the location information, and the ambient environment information is received with the location information, wherein the ambient environment information is one of audio information or video information of the user terminal;

retrieving geographical information stored in the broadcast receiver, wherein retrieving the geographical information includes:
  determining whether or not the location information includes the geographical information; and
  retrieving geographical information stored in the broadcast receiver when the location information does not include geographical information;
continuously marking locations of the user terminal in an order in which a plurality of corresponding location information are received from the user terminal to mark a movement path of the user terminal;
displaying, on a screen of the broadcast receiver, the geographical information and the movement path as a line of movement of the user terminal, and outputting the ambient environment information received from the user terminal related to the location information;
receiving a power-off request from a user;
receiving a request to continue receiving the location information from the user terminal; and
turning off power to certain components of the broadcast receiver, and continuing storing the location of the user terminal.

2. The method according to claim 1, wherein marking the locations of the user terminal includes:
  extracting coordinate information from the location information received from the user terminal; and
  marking the locations of the user terminal on the geographical information using the coordinate information.

3. The method according to claim 1, wherein requesting the location information of the user terminal from the broadcast receiver includes transmitting an identification number of the broadcast receiver and an identification number of the user terminal to the user terminal.

4. The method according to claim 1, further comprising:
  modifying the geographical information stored in the broadcast receiver; and
  storing the modified geographical information.

5. The method according to claim 4, further comprising marking the locations of the user terminal on the modified geographical information and displaying the marked location of the user terminal.

6. The method according to claim 4, wherein modifying the geographical information includes changing scale of the geographical information, inserting at least one of an image, an avatar, and an emoticon into the geographical information.

7. The method according to claim 1, further comprising storing the geographical information marked with the locations of the user terminal or with the movement path of the user terminal.

8. The method according to claim 4, wherein modifying the geographical information includes inserting audio data into the geographical information based on the received ambient environment information related to the location information.

9. A broadcast receiver for providing location information of a user terminal, the broadcast receiver comprising:
  a user interface for receiving a request from a user;
  a communication unit for requesting, to a user terminal, location information through a communication network and receiving the location information and ambient environment information from the user terminal in response to the request, wherein the environment information is selected from the user terminal, the ambient environment information received from the user terminal relates to the location information, and the ambient environment information is received together with the location information, wherein the ambient environment information is one of audio information or video information of the user terminal;
  a storage unit for storing geographical information and for storing information corresponding to each of at least one user terminal;
  a location information processor for continuously marking a plurality of locations of the user terminal on the geographical information using the location information received from the user terminal;
  a screen for displaying the marked plurality of locations of the user terminal in the form of a continuous line;
  a unit to output the ambient environment information related to the location information of the user terminal;
  a controller for controlling the screen to display the continuous line representing the plurality of locations of the user terminal on the geographical information;
  a signal converter for converting, when the location information includes video or audio information not complying with a specification of the broadcast receiver, the video or audio information into a format complying with the specification of the broadcast receiver;
  a broadcast signal input unit for tuning to a channel and receiving a broadcast signal through the tuned channel or receiving a broadcast signal from an external device;
  a decoding unit for decoding the broadcast signal and the video or audio information included in the location information;
  an A/V signal output unit for outputting the decoded broadcast signal or video or audio information; and
  a signal synthesizer for outputting information output from the A/V signal output unit together with the location of the user terminal.

10. The broadcast receiver according to claim 9, wherein the storage unit stores the geographical information marked with the locations of the user terminal.

11. The broadcast receiver according to claim 9, wherein the output unit includes an OSD processor for outputting the locations of the user terminal using OSD data.

12. A method of providing location information of a user terminal, the method comprising:
  registering at least one user terminal;
  storing, at a memory of the broadcast receiver, information corresponding to each of the at least one user terminal;
  receiving location information regarding the user terminal and ambient environment information regarding the location information, wherein the environment information is selected from the user terminal, the ambient environment information is received together with the location information, wherein the ambient environment information is one of audio information or video information of the user terminal;
  obtaining geographic information based on the received location information, wherein obtaining the geographical information includes:
    determining whether or not the location information includes the geographical information; and
    obtaining geographical information stored in the broadcast receiver when the location information does not include geographical information;
  displaying, on a display, a travel line on the geographic information, the displayed travel line representing continuous movement of the user terminal from a first point to a second point, and outputting the ambient environment information regarding the location information of the user terminal;
  receiving a power-off request from a user;

receiving a request to continue receiving the location information from the user terminal; and turning off power to certain components of the broadcast receiver, and continuing storing the location of the user terminal.

13. The method according to claim 12, wherein the geographic information is a map.

\* \* \* \* \*